United States Patent [19]
Brenter

[11] Patent Number: 5,863,051
[45] Date of Patent: Jan. 26, 1999

[54] FOLDING SKIBOB

[75] Inventor: Erich Brenter, Oberndorf, Austria

[73] Assignee: Brenter Skibob KG, Oberndorf, Austria

[21] Appl. No.: 698,727

[22] Filed: Aug. 16, 1996

[51] Int. Cl.[6] .................................................. B62B 13/16
[52] U.S. Cl. ............................ 280/16; 280/21.1; 280/25; 280/20
[58] Field of Search .......................... 280/16, 21.1, 23.1, 280/25, 12.1, 20

[56] References Cited

U.S. PATENT DOCUMENTS

| | | | |
|---|---|---|---|
| 3,638,960 | 2/1972 | Eaton | 280/16 |
| 3,717,359 | 2/1973 | Peronnon et al. | 280/16 |
| 3,870,330 | 3/1975 | Hatano et al. | 280/16 |
| 4,097,055 | 6/1978 | Laycraft | 280/16 |
| 4,909,537 | 3/1990 | Tratner | 280/278 |

*Primary Examiner*—Peter C. English
*Assistant Examiner*—Michael Cuff
*Attorney, Agent, or Firm*—Herbert L. Lerner; Laurence A. Greenberg; Werner H. Stemer

[57] ABSTRACT

A foldable skibob includes a frame with a steering column journalled in a forward steering column bearing. A first pivot configuration is attached to the steering column and a front ski is articulated at the first pivot configuration. A second pivot configuration is attached at the rear end and a rear ski is articulated at the second pivot configuration. A first spring support supports the first pivot configuration against the steering column, and a second spring support supports the second pivot configuration against the rear end of the frame. A support element is provided at one of the first and second spring supports against which a respective pivot configuration rests when the skibob is in an operational condition. The support element is pivotable away from the support element towards a center region of the frame between the front end and the rear end for folding the skibob.

15 Claims, 3 Drawing Sheets

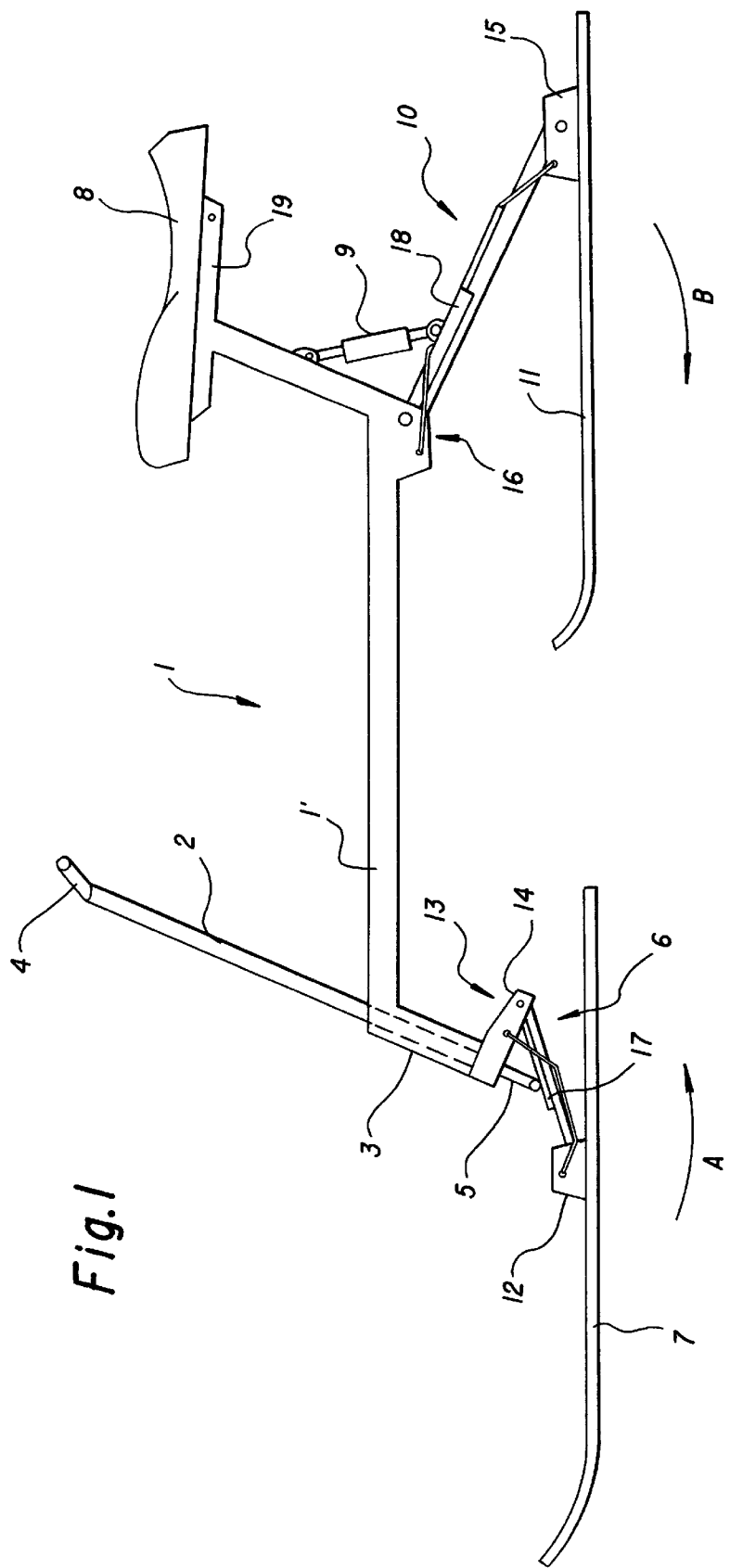

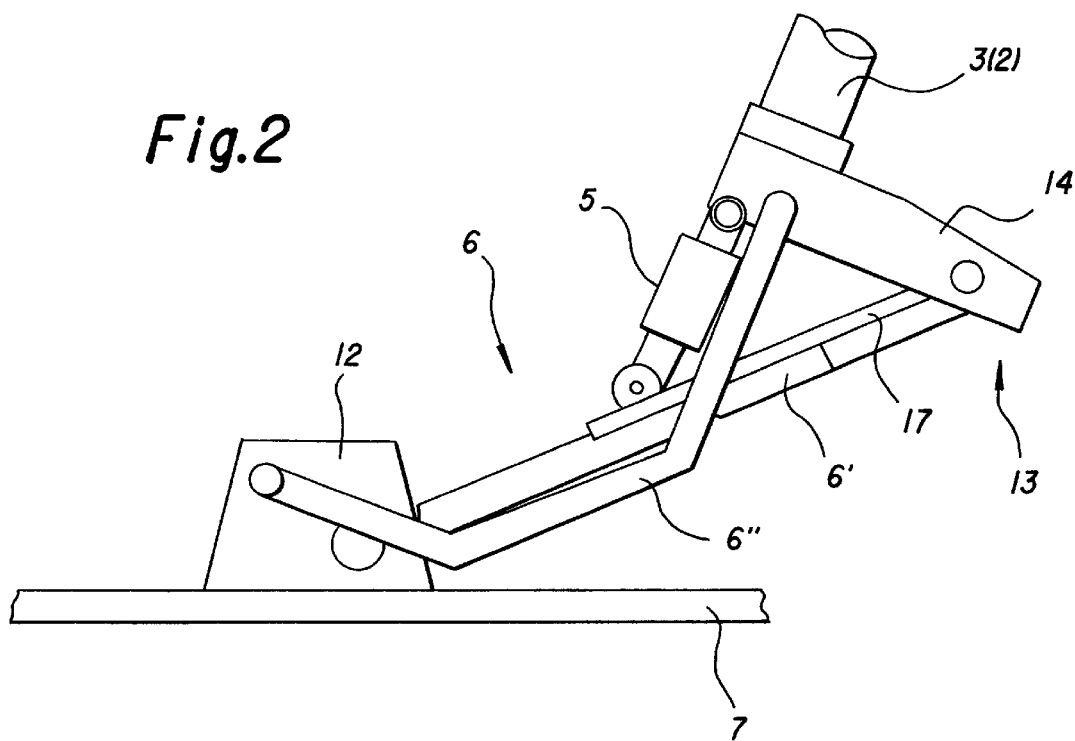
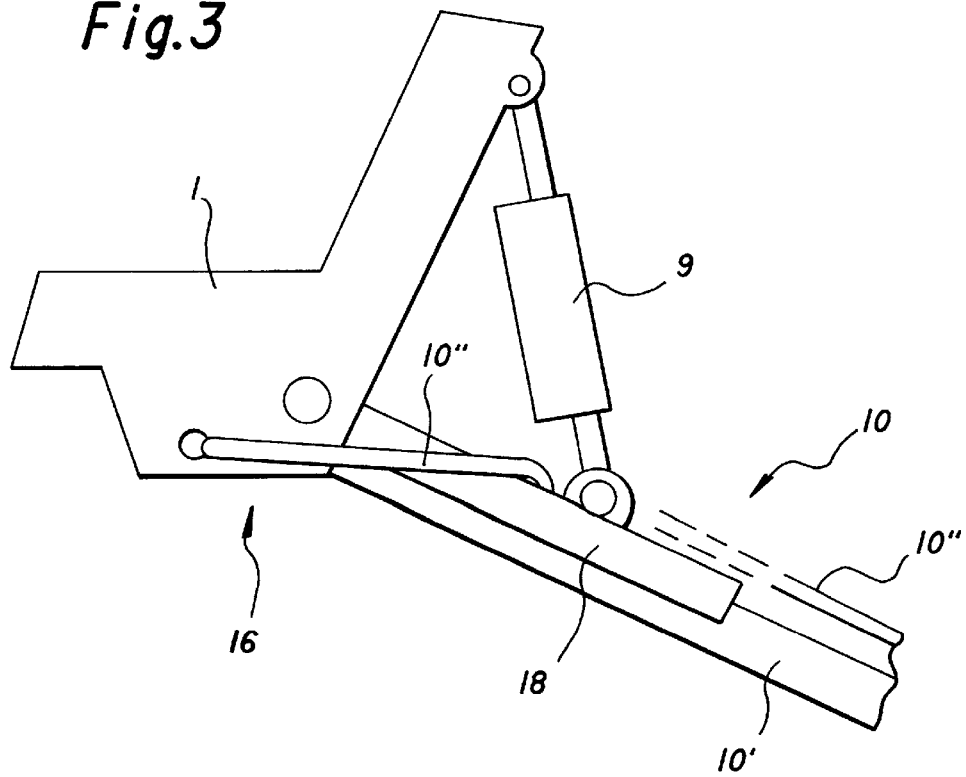

FOLDING SKIBOB

BACKGROUND OF THE INVENTION

Field of the Invention

The invention relates to skibobs. Skibobs have frames which, in principle, are similar to bicycle frames with a seat and a forward steering column with a handlebar. The skibob slides on short skis, including a steerable forward ski and a rear ski.

Prior art skibobs of the above-mentioned kind are relatively bulky devices which cannot be easily handled, particularly For transporting them. Skibobs do not fit into automobile trunks and public transportation vehicles are also not generally equipped to handle prior art skibobs. Furthermore, most ski resorts disallow skibobs to be carried on chair lifts and T-bars. Finally, increasing popularity of smaller gondolas (2–8 persons) have made transporting skibobs in ski resorts even more difficult.

SUMMARY OF THE INVENTION

It is accordingly an object of the invention to provide a folding skibob, which overcomes the above-mentioned disadvantages of the heretofore-known devices and methods of this general type and which can be folded without problem in order to reduce its measurements for transport or storing and which can again be returned to usable condition just as easily for use.

With the foregoing and other objects in view there is provided, in accordance with the invention, a foldable skibob, comprising:

a frame defining a forward end and a rear end of the skibob, the frame including a steering column bearing at the forward end, and a steering column journalled in the steering column bearing;

a first pivot configuration attached to the steering column and a front ski articulated at the first pivot configuration;

a second pivot configuration attached at the rear end and a rear ski articulated at the second pivot configuration;

a first spring support resiliently supporting the first pivot configuration against the steering column, and a second spring support resiliently supporting the second pivot configuration against the rear end of the frame; and a support element attached to one of the first and second spring supports, a respective the pivot configuration resting against the support element when the skibob is in an operational condition, and being pivotable away from the support element towards a center region of the frame between the front end and the rear end thereof for folding the skibob.

In accordance with an added feature of the invention, there are provided two support elements, each attached to a respective spring support and each supporting a respective pivot configuration when the skibob is in the operational condition.

In accordance with an additional feature of the invention, the support element is a support and auxiliary lever attached at the steering column and/or at the rear end of the frame.

In accordance with another feature of the invention, the support and auxiliary lever is a leaf spring.

In accordance with a further feature of the invention, the support and auxiliary lever is articulated at the steering column and/or at the rear end of the frame about an axis parallel to a pivot axis of the pivot configurations.

In accordance with again an added feature of the invention, there is provided a hinge articulatingly attaching the support and auxiliary lever at the steering column and/or at the rear end of the frame.

In accordance with again another feature of the invention, the first and second pivot configurations each includes a pivot arm, and the support element is at least partly formed with a U-shaped profile engaging the pivot arm of the respective pivot configuration when the skibob is in the operational condition. Alternatively, the support element is at least partly formed with a fork-shaped profile engaging the respective pivot arm.

In accordance with yet another feature of the invention, each of the first and second pivot configurations includes a rigid pivot arm and a resiliently springy pivot arm, the springy pivot arm being a past dead center spring selectively forcing the respective rigid pivot arm towards an operational position thereof or towards a folding position thereof in the center region of the frame.

In accordance with concomitant features of the invention, there is provided a detachable steering device, such as a handlebar, attached on the steering column and a foldable bench seat attached to the frame.

The transition of the skibob from the operational state to a folded state is particularly simple: The first (forward) pivot configuration is folded backwards underneath the frame or a frame part, respectively, extending between the forward and rear ends of the frame. Analogously, the second (rear) pivot configuration may be folded forward. The two springs and the associated spring supports are counter-bearings for the pivot configurations and they are not pivoted when the skibob is folded. In other words, since the springs and spring supports are not folded (between operational and non-operational positions), they may be maximized solely in terms of their spring, support, and shock absorbing properties.

The embodiment of the support elements as auxiliary levers against which the pivot arms abut (in the operational position), allows a particularly sturdy and dependable formation thereof.

Other features which are considered as characteristic for the invention are set forth in the appended claims.

Although the invention is illustrated and described herein as embodied in a folding skibob, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a diagrammatic side elevational view of a preferred embodiment of the skibob according to the invention;

FIG. 2 is a partial side elevational view of a forward pivot configuration together with a corresponding spring element;

FIG. 3 is a similar view of a rear pivot configuration; and

DESCRIPTION OF THE PREFERRED EMBODIMENTS

Figure 4A:
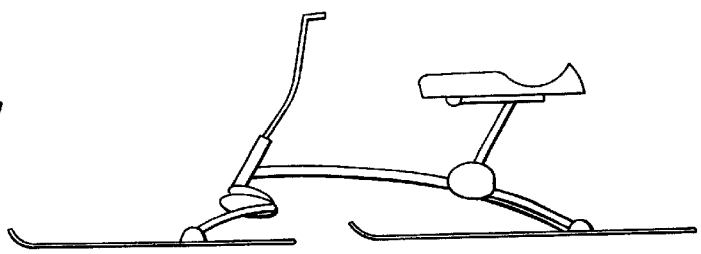
FIGS. 4a–4e are diagrammatic side-elevational views showing a folding sequence of the skibob.
Figure 4B:
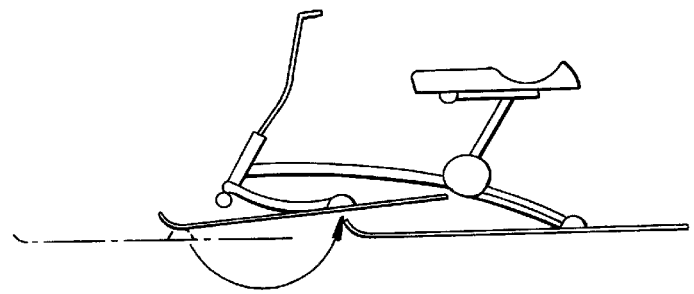
Figure 4C:
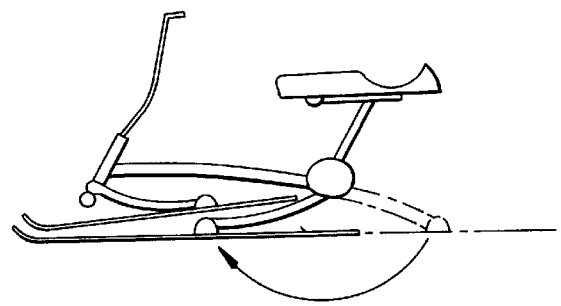
Figure 4D:
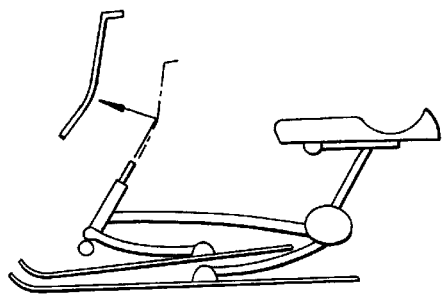

Referring now to the figures of the drawing in detail and first, particularly, to FIG. 1 thereof, a skibob according to the preferred embodiment comprises a frame 1 made of steel pipe profiles, at which a steering column 2 is journalled (pivotally mounted) at a forward end of the skibob. A steering column bearing 3, formed of a pipe profile of the frame 1, guides the steering column 2.

A handlebar 4, is detachably mounted at an upper end of the steering column 2. A lower end of the steering column 2 projects out of the pipe profile 3. A forward ski 7 of the skibob is mounted at the lower end. A pivot configuration 6 provides the mounting structure, together with a spring or shock absorber 5'.

A bench seat 8 is disposed at the rear of the frame 1. A rear spring 9 and a rear pivot configuration 10 are provided below the bench 8 on the frame 1. A rear ski 11 is connected to the frame 1 by the intermediary of the rear pivot configuration 10.

A bearing support 13 is provided for the pivot configuration 6 at the front ski 12 and on the lower end of the steering column 12, i.e. on an arm 14 which extends radially away from the lower end of the steering column 2 towards the back of the skibob. The arm 14 is rigidly connected with the steering column 2.

A bearing connector 15 is provided at the rear pivot configuration 10. The bearing connector 15 is attached to the rear ski 11 and a bearing 16 is provided on the frame 1 which pivotally connects the rear pivot configuration 10 at the frame 1.

With the skis in operational mode, the pivot configurations 6 and 10 are oriented in such a way that they extend obliquely downwardly from their upper bearings 13 or 16, respectively. The forward pivot configuration 6 projects forwardly and the rear pivot configuration 10 projects backwardly. Accordingly, the bearings are arranged such that are disposed—starting from the front of the skibob—with the bearing 13 following the support bearing 12, and the bearing 15 following the bearing 16.

A support and auxiliary lever 17 is provided for the front pivot configuration 6. One end of the lever 17 is pivotally attached at the free end of the support arm 14. The other end of the lever 17 is supported at the spring 9. The spring 9 is preferably a pressure spring, a telescope spring, a double hydraulic or pneumatic absorber. The spring lift or telescoping action of the spring 9 is along the axis of the steering column 2. When the skibob is in operation, the pivot configuration 6 or a stiff pivot arm 6' of this pivot configuration supports itself from below on the support and auxiliary lever 17. This results in a spring support of the skibob at its forward end, as the pivot configuration 6 pivots about the bearing 13. The support and auxiliary lever 17 is thereby pivotable about an axis parallel to the pivot axis of the pivot configuration 6 on the arm 14.

On the bearing 16 there is provided a second support and auxiliary lever 18. One end of the lever 18 is pivotable about an axis which lies parallel to the pivot axis of the pivot configuration 10 and therefore vertical to a plane of the frame. A pressure spring or telescopic spring 9 functions between the free end of the auxiliary lever 18 and the frame 1. The pivot configuration 10 or a rigid lever of the pivot configuration abuts from below against the support and auxiliary lever 18. This results in a spring and shock absorption system at the rear of the skibob. The support and auxiliary levers 17 and/or 18 are, for example, constructed in the shape of a U-profile in such a way that they overlap the respective pivot configurations 6 or 10 in a fork-like manner when the skibob is in operational condition, whereby additional stability is assured.

The novel skibob is particularly useful because both of the pivot configurations 6 and 10 can be folded inside for transporting and/or storing the skibob. A folding sequence is illustrated in FIGS. 4a–4e. First, the pivot configuration 6 together with the front ski 7 is rotated inwardly along the arrow A. Next, the pivot configuration 10 with the rear ski 11 is pivoted inwardly towards the front ski along the arrow B. The support and auxiliary levers 17 and 18 and the corresponding springs 5 and 9 are not pivoted. The skibob can also be folded in such a way that both skies 7 and 11 are located fully below the horizontal frame element 1'.

By appropriate pivoting of the steering column 2 as well as because of a play which exists especially when the front of the pivot configuration 6 or the back of the pivot configuration 10 are not gripping into the auxiliary levers 17 and 18, both skies 7 and 11 can be stored below the frame element 1' next to each other when the skibob is folded.

Figure 4E:
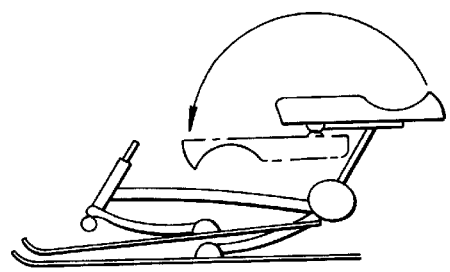

The size of the skibob may be additionally reduced by removing the steering device 4 altogether. Furthermore, the bench seat 8 is provided on a carrier 19 in such a way that it can be pushed forward along this carrier and can then be rotated by 180° around the axis of the carrier 19 which extends orthogonally relative to the plane of the frame. As seen in FIG. 4e, the bench 8 comes to lie below the carrier 19.

With reference to FIG. 2, the pivot configuration 6 comprises a rigid pivot arm 6' and a springy pivot arm 6". The orientation of the front ski 7 is defined by the levers 6' and 6" and it can be pivoted only by elastic deformation of the pivot arm 6" especially around the lower pivot point of the rigid pivot arm 6' on the bearing 12.

When folding the skibob the pivot arm 6" works as a snap spring past dead center point which is first tightened when folding or pivoting the pivot configuration 6 in the direction of the arrow A. Past dead center, the pivot arm 6" relaxes so that the folded skibob is further stabilized.

With reference to FIG. 3, the pivot configuration 10 also consists of a rigid pivot arm 10' and of a springy pivot arm 10", the latter being formed of a springy, spring-like element. The pivot arm 10" also works as a past dead center point spring when the skibob is being folded.

In the illustrated embodiment the spring 5 is articulated at one end at the lower end of the steering column 2 and at the other end at the auxiliary lever 17. Similarly, one end of the spring 9 is articulated at the frame 1 and the other end is articulated at the auxiliary lever 18.

Several modifications within the spirit of the invention are, of course, possible. For example, to form a support and auxiliary lever, the front support and auxiliary lever 17 or both support and auxiliary levers may be formed as leaf-springs which are then rigidly connected to the arm 14 or the frame 1 on one end.

I claim:
1. A foldable skibob, comprising:
    a frame defining a forward end and a rear end of the skibob, said frame including a steering column bearing at said forward end, and a steering column journalled in said steering column bearing;
    a first pivot configuration pivotally attached to said steering column and a front ski pivotally attached to said first pivot configuration;
    a second pivot configuration pivotally attached at said rear end and a rear ski pivotally attached to said second pivot configuration;
    a first spring support resiliently supporting said first pivot configuration against said steering column, and a sec- ond spring support resiliently supporting said second pivot configuration against said rear end of said frame; and a support element attached to one of said first and second spring supports, a respective one of said first and second pivot configurations resting against said support element when the skibob is in an operational conditions and being pivotable away from said support element towards a center region of said frame between said front end and said rear end thereof for folding the skibob.

2. The skibob according to claim 1, wherein said support element is one of two support elements each attached to a respective said spring support and each supporting a respective one of said first and second pivot configuration when the skibob is in the operational condition.

3. The skibob according to claim 1, wherein said support element is a support and auxiliary lever attached at said steering column.

4. The skibob according to claim 3, wherein said support and auxiliary lever is a leaf spring.

5. The skibob according to claim 1, wherein said support element is a support and auxiliary lever articulated at said steering column about an axis parallel to a pivot axis of said first pivot configuration.

6. The skibob according to claim 5, wherein said support and auxiliary lever is articulatingly attached to said steering column.

7. The skibob according to claim 1, wherein said support element is a support and auxiliary lever attached at said rear end of said frame.

8. The skibob according to claim 7, wherein said support and auxiliary lever is a leaf spring.

9. The skibob according to claim 1, wherein said support element is a support and auxiliary lever articulated at said rear end of said frame about an axis parallel to a pivot axis of said second pivot configuration.

10. The skibob according to claim 9, wherein said support and auxiliary lever is articulatingly attached to said rear end of said frame.

11. The skibob according to claim 1, wherein said first and second pivot configurations each include a pivot arm, and wherein said support element is formed with a U-shaped profile engaging said pivot arm of said respective pivot configuration when the skibob is in the operational condition.

12. A foldable skibob, comprising:

a frame defining a forward end and a rear end of the skibob, said frame including a steering column bearing at said forward end, and a steering column journalled in said steering column bearing;

a first pivot configuration attached to said steering column and a front ski articulated at said first pivot configuration;

a second pivot configuration attached at said rear end and a rear ski articulated at said second pivot configuration;

a first spring support resiliently supporting said first pivot configuration against said steering column, and a second spring support resiliently supporting said second pivot configuration against said rear end of said frame; and a support element attached to one of said first and second spring supports, a respective one of said first and second pivot configurations resting against said support element when the skibob is in an operational condition, and being pivotable away from said support element towards a center region of said frame between said front end and said rear end thereof for folding the skibob, wherein said first and second pivot configurations each include a pivot arm, and wherein said support element is formed with a fork-shaped profile engaging said pivot arm of said respective pivot configuration when the skibob is in the operational condition.

13. A foldable skibob, comprising:

a frame defining a forward end and a rear end of the skibob, said frame including a steering column bearing at said forward end, and a steering column journalled in said steering column bearing;

a first pivot configuration attached to said steering column and a front ski articulated at said first pivot configuration;

a second pivot configuration attached at said rear end and a rear ski articulated at said second pivot configuration;

a first spring support resiliently supporting said first pivot configuration against said steering column, and a second spring support resiliently supporting said second pivot configuration against said rear end of said frame; and a support element attached to one of said first and second spring supports, a respective one of said first and second pivot configurations resting against said support element when the skibob is in an operational condition, and being pivotable away from said support element towards a center region of said frame between said front end and said rear end thereof for folding the skibob, wherein each of said first and second pivot configurations includes a rigid pivot arm and a resiliently springy pivot arm, said springy pivot arm being a past dead center spring selectively forcing said respective rigid pivot arm towards an operational position thereof or towards a folding position thereof in the center region of said frame.

14. The skibob according to claim 1, which further comprises a detachable steering device attached on said steering column.

15. The skibob according to claim 1, which further comprises a foldable bench seat attached to said frame.

* * * * *

UNITED STATES PATENT AND TRADEMARK OFFICE
CERTIFICATE OF CORRECTION

PATENT NO.  : 5,863,051
DATED       : January 26, 1999
INVENTOR(S) : Erich Brenter It is certified that error appears in the above-identified patent and that said Letters Patent is hereby corrected as shown below:

Title page,
Insert -- Item [30], should read as follows:
Aug. 16, 1995    (DE) ........ 195 30 081.5 --

Signed and Sealed this

Thirtieth Day of April, 2002

Attest:

JAMES E. ROGAN
*Attesting Officer*        *Director of the United States Patent and Trademark Office*